United States Patent
King et al.

(10) Patent No.: US 9,796,364 B2
(45) Date of Patent: Oct. 24, 2017

(54) APPARATUS AND METHOD FOR ADVANCED ANTI-SKID BRAKE AND TRACTION CONTROLS

(75) Inventors: Robert Dean King, Schenectday, NY (US); Ayman M. El-Refaie, Niskayuna, NY (US); Christof Martin Sihler, Hallbergmoos (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 2448 days.

(21) Appl. No.: 12/413,856

(22) Filed: Mar. 30, 2009

(65) Prior Publication Data

US 2010/0250082 A1 Sep. 30, 2010

(51) Int. Cl.
*B60T 8/171* (2006.01)
*B60T 8/32* (2006.01)
(Continued)

(52) U.S. Cl.
CPC .............. *B60T 8/171* (2013.01); *B60T 8/329* (2013.01); *G01P 3/487* (2013.01);
(Continued)

(58) Field of Classification Search
USPC ........... 701/70–71, 78, 82–83; 188/17, 18 A, 188/18 R, 135, 137, 158–164; 310/77,
(Continued)

(56) References Cited

U.S. PATENT DOCUMENTS 3,299,353 A   1/1967  Grant et al.
3,522,973 A * 8/1970  Hans-Christof et al. ..... 303/167
(Continued)

FOREIGN PATENT DOCUMENTS

DE   19616258 A1   10/1997
DE   19706585 A1   8/1998
(Continued)

OTHER PUBLICATIONS

Stupak Jr., Joseph J. "Methods of Magnetizing Permanent Magnets". Oersted Techology Corp. Oct. 2000. [http://oersted.com/magnetizing.PDF].*

*Primary Examiner* — Redhwan k Mawari
*Assistant Examiner* — Michael Whalen
(74) *Attorney, Agent, or Firm* — Meagher Emanuel Laks Goldberg & Liao, LLP

(57) ABSTRACT

A disk brake system includes a magnetically encoded disk brake rotor having at least one magnetized section encoded therein and a disk brake caliper comprising a plurality of disk brake pads attached thereto, the disk brake pads positioned adjacently to the disk brake rotor and configured to frictionally engage the disk brake rotor upon operation of the disk brake caliper. The disk brake system further comprises a sensor assembly mounted proximately to the disk brake rotor and comprising at least one magnetic field sensor configured to detect the at least one magnetic field, and a controller configured to receive signals from the at least one magnetic field sensor. The controller is further configured to enable selective operation of the disk brake caliper based on the signals received from the at least one magnetic field sensor.

21 Claims, 8 Drawing Sheets

US 9,796,364 B2
Page 2

(51) Int. Cl.
*G01P 3/487* (2006.01)
*F16D 66/00* (2006.01)

(52) U.S. Cl.
CPC .. *F16D 2066/003* (2013.01); *F16D 2066/005* (2013.01); *Y10T 29/49826* (2015.01)

(58) Field of Classification Search
USPC ............. 310/103, 503, 503.3, 504.8, 156.05, 310/156.35, 504.11, 40 R, 49.32, 49.39, 310/156.01
See application file for complete search history.

(56) References Cited

U.S. PATENT DOCUMENTS

| | | | | |
|---|---|---|---|---|
| 4,086,519 A | * | 4/1978 | Persson | 318/400.38 |
| 4,566,338 A | * | 1/1986 | Fleming et al. | 73/862.333 |
| 4,697,459 A | * | 10/1987 | Nonomura et al. | 73/862.333 |
| 4,750,371 A | * | 6/1988 | Kobayashi et al. | 73/862.336 |
| 4,899,145 A | * | 2/1990 | Okuda et al. | 341/15 |
| 5,067,778 A | * | 11/1991 | Testardi | 303/113.1 |
| 5,864,192 A | * | 1/1999 | Nagate et al. | 310/156.05 |
| 6,212,463 B1 | * | 4/2001 | Aizawa | 701/80 |
| 6,244,391 B1 | * | 6/2001 | Bunker | 188/18 A |
| 6,668,983 B2 | * | 12/2003 | Drennen et al. | 188/181 T |
| 7,610,998 B2 | * | 11/2009 | Baumgartner et al. | 188/72.9 |
| 7,694,555 B2 | * | 4/2010 | Howell et al. | 73/129 |
| 2002/0005674 A1 | * | 1/2002 | Hayashi | 310/168 |
| 2002/0124663 A1 | * | 9/2002 | Tokumoto et al. | 73/862.333 |
| 2004/0112146 A1 | * | 6/2004 | Islam et al. | 73/862.331 |
| 2004/0140166 A1 | * | 7/2004 | Brown et al. | 188/218 XL |
| 2004/0263160 A1 | * | 12/2004 | Nihei et al. | 324/207.25 |
| 2007/0225890 A1 | * | 9/2007 | Ringlstetter | 701/70 |
| 2011/0174581 A1 | * | 7/2011 | Vollert | F16D 55/22 188/72.1 |
| 2014/0001756 A1 | * | 1/2014 | Panosyan | H02K 49/046 290/7 |

FOREIGN PATENT DOCUMENTS

| | | | | |
|---|---|---|---|---|
| EP | 1870679 A1 | | 12/2007 | |
| JP | 03074596 A | * | 3/1991 | F04C 29/00 |
| JP | 2000133518 A | * | 5/2000 | H01F 13/00 |

* cited by examiner

APPARATUS AND METHOD FOR ADVANCED ANTI-SKID BRAKE AND TRACTION CONTROLS

BACKGROUND

The invention relates generally to disk brake assemblies and, more specifically, to the control of disk brakes via magnetic field sensors and magnetically encoded disk brake rotors.

Many modern vehicles incorporate at least an Anti-skid Braking System (ABS) and/or a Traction Control (TC) system to aid in the prevention of wheel lock-up or wheel slip. When driving surface conditions are less than optimal (for example, in snow, rain, or mud), wheel lock-up during braking and wheel slip during acceleration can cause a reduction in control of the vehicle between the driving surface and the wheels. It is the purpose of the ABS and TC systems to minimize any such reductions in control of the vehicle.

Typically, the ABS and/or TC systems rely upon wheel speed sensors mounted on a stationary part of the vehicle near the rotating wheels or brake rotors. Feedback signals from these speed sensors are sent to a controller within the vehicle, which monitors the feedback signals received from the various speed sensors and determines if wheel lock-up or wheel slip is occurring. Such a determination is usually made by comparing a reference speed signal (e.g., the average speed of all wheels at a particular moment) with a sensed speed signal at a particular wheel. If an abrupt change in the absolute value of the difference of the reference speed signal and the sensed speed signal exceeds a predetermined threshold, a signal is issued to a controller to indicate that wheel lock-up or wheel slip is occurring. In the case of the detection of wheel lock-up, the vehicle's disk brake at the offending wheel is momentarily disengaged in an effort to reduce skidding of the vehicle. In the case of the detection of wheel slip, the vehicles disk brake at the offending wheel may be momentarily engaged in an effort to reduce wheel spin.

The speed sensors used in conventional ABS and TC systems often rely on a physical pattern in the rotating surface, such as a toothed notch in the brake rotor or the wheel itself, to enable determination of wheel lock-up or wheel slip. Conventional sensors such as Hall sensors, variable reluctance sensors, and even optical sensors use the physical pattern in the rotating surface to aid in the determination of the rotational speed of the wheel. From the rotational speed, the ABS or TC systems can determine if a particular wheel is locked or slipping, as discussed above. However, due to the harsh environments to which the wheel assemblies are exposed, it is not uncommon for the physical pattern (often a toothed notch) to become clogged with debris or rust, reducing or eliminating the detection performance of the speed sensors by the ABS or TC system. Thus, performance of the overall ABS and/or TC systems may be affected.

Additionally, the speed sensors used in conventional ABS and TC systems have a relatively low bandwidth. Thus, the bandwidth of the corrective action, such as a momentarily release the brakes to reduce skidding or a momentarily application of the brakes to reduce wheel spin, is correspondingly low. This low bandwidth reduces the effectiveness and response time of the ABS and TC systems.

Due to the harsh environmental conditions to which most ABS and/or TC systems are exposed, conventional ABS and/or TC systems are prone to failure, necessitating costly repairs or replacement. Furthermore, the low bandwidth of the speed sensors of conventional ABS and/or TC systems also limits the effectiveness of the systems in situations where reaction time is paramount. Without a functioning ABS and/or TC system, a vehicle will obviously lack an effective remedy to unexpected wheel lock-up or wheel slip.

Therefore, it is desirable to provide a disk brake system that does not rely upon surface patterns on a wheel or disk brake rotor or conventional speed sensors to provide feedback for an ABS and/or TC system. Utilization of such a system will greatly improve the lifespan and effectiveness of ABS and/or TC systems.

BRIEF DESCRIPTION OF THE INVENTION

In accordance with one aspect of the invention, a disk brake system is shown, the disk brake system comprising a magnetically encoded disk brake rotor having at least one magnetized section encoded therein and a disk brake caliper comprising a plurality of disk brake pads attached thereto, the disk brake pads positioned adjacently to the disk brake rotor and configured to frictionally engage the disk brake rotor upon operation of the disk brake caliper. The disk brake system further comprises a sensor assembly mounted proximately to the disk brake rotor and comprising at least one magnetic field sensor configured to detect the at least one magnetic field, and a controller configured to receive signals from the at least one magnetic field sensor, wherein the controller is further configured to enable selective operation of the disk brake caliper based on the signals received from the at least one magnetic field sensor.

In accordance with another aspect of the invention, a method of controlling a braking system in a vehicle is shown, the method comprising detecting at least one magnetic field from a magnetically encoded brake rotor using a plurality of magnetic field sensors, and determining a brake rotor torque, a wheel speed, and a wheel direction based on the at least one detected magnetic field. The method further comprises controlling an engagement of a brake caliper with the brake rotor based on the brake rotor torque, wheel speed, and wheel direction.

In accordance with another aspect of the invention, a method of manufacturing a disk brake assembly for a vehicle is shown, wherein the method comprises magnetically encoding a disk brake rotor using at least one conductor electrically connected to at least one electrode, wherein the at least one electrode is attached to a surface of the disk brake rotor, and mounting a plurality of magnetic field sensors in proximity to the disk brake rotor such that the magnetic field sensors detect at least one magnetic field emanating from the magnetically encoded disk brake rotor. The method further comprises inserting the disk brake rotor into a disk brake caliper such that the disk brake caliper can be selectively engaged with the disk brake rotor.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

A system and method is shown for detecting brake torque, wheel speed, and wheel direction in a disk brake assembly by way of a magnetically encoded disk brake rotor and a plurality of magnetic field sensors. The system improves the dynamic performance of ABS and/or TC systems.

Magnetostrictive measurement is a technique for measuring torque such as, for example, in rotating shafts. The magnetostrictive measurement technique makes use of the phenomenon that a material changes dimensions upon being magnetized. In advanced magnetostrictive measurement methods a technique is applied where a ferromagnetic shaft is magnetically encoded, either entirely or sectionally, thereby imparting a change in the material dimensions of the shaft along the magnetic axis. When a torque is applied to the shaft, a torque-dependent magnetic field is generated. This torque-dependent magnetic field can be measured by a magnetic field sensor that is located in proximity to the magnetically encoded region of the shaft, and thus the torque on the shaft can be determined. In this way, the magnetically encoded ferromagnetic shaft itself becomes a part of the torque sensing system. The build-up of debris or rust located on the ferromagnetic shaft typically has little affect the operation of the magnetostrictive torque sensing system, as the magnetization is within the shaft itself.

While the magnetostrictive measurement technique has been pondered for use in determining the torque, the sectional magnetic encoding technique also allows determining the speed and direction of rotation of the shaft. Again, because the magnetization is within the shaft itself, there is no external physical notch or tooth that must be placed on the shaft to allow a sensor to determine speed or direction of rotation.

In most conventional vehicles, the disk brake rotors used with each wheel are formed of a ferromagnetic material, such as industrial steel. As such, disk brake rotors could themselves be considered ferromagnetic assemblies capable of being magnetically encoded and capable of the magnetostrictive measurement of torque, rotational speed, and rotational direction according to embodiments of the invention, which employ a magnetostrictive measurement technique that enables brake torque, wheel speed, and the rotational direction of a wheel to be determined using magnetically encoded disk brake rotors.

Figure 1:
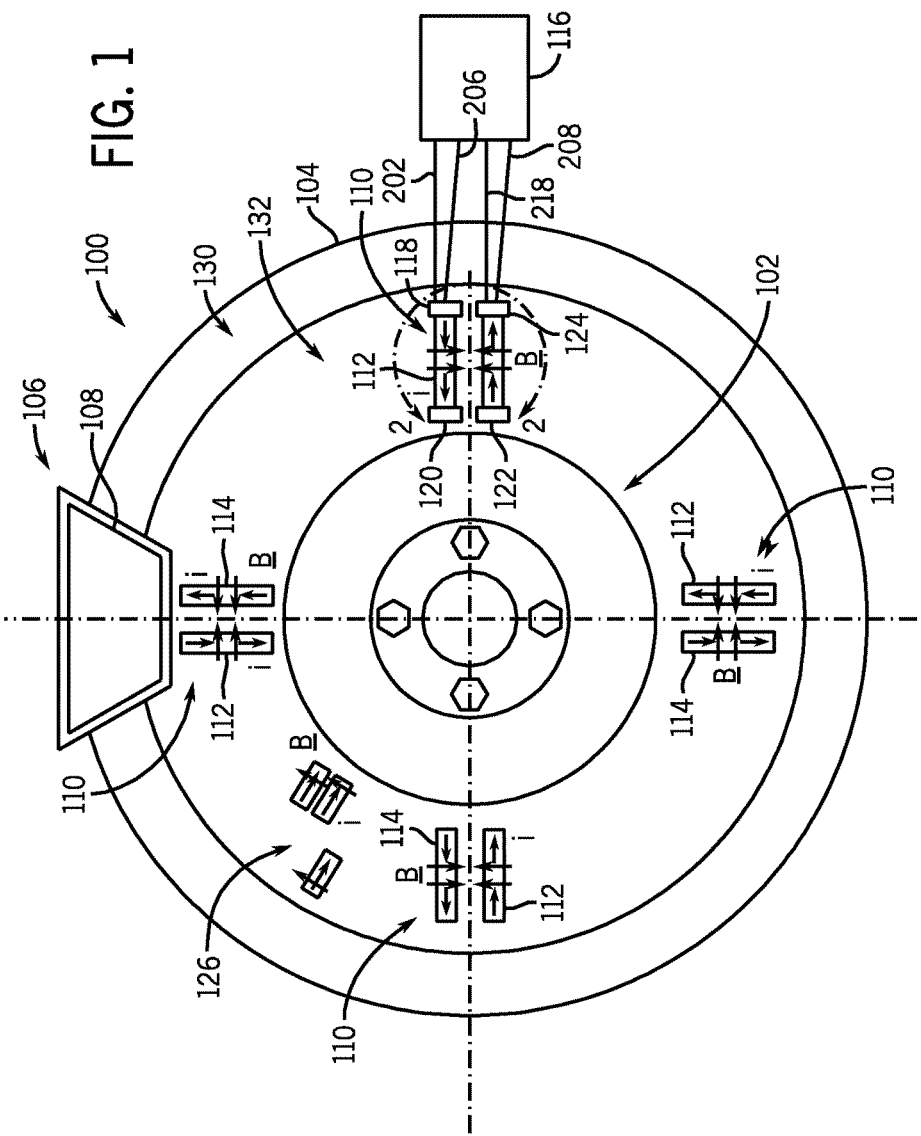
FIG. 1 schematically illustrates a disk brake assembly according to an embodiment of the invention.

Referring to FIG. 1, a disk brake assembly 100 is shown. As is illustrated, disk brake assembly 100 includes a disk brake rotor hub/wheel mount assembly 102 and a disk brake rotor 104. A disk brake caliper 106 having a plurality of disk brake pads 108 affixed thereon is positioned about disk brake rotor 104 such that disk brake pads 108 contact disk brake rotor 104 and create stopping friction when disk brake caliper 106 is actuated. Additionally, disk brake assembly 100 shows a plurality of magnetic encoding assemblies 110 disposed on the surface of disk brake rotor 104. Each assembly 110 comprises a pair of conducting segments 112, 114, each conducting segment having one end in contact with disk brake rotor 104. Another set of magnetic encoding assemblies 126 is similarly mounted to disk brake rotor 104. The differences in the magnetic regions encoded by magnetic encoding assemblies 110 and 126, respectively, will be discussed below with respect to FIG. 3. As can be seen in FIG. 1, disk brake rotor 104 comprises two regions, an outer region 130 and an inner region 132. In one embodiment, outer region 130 is a 1 inch to 2 inch region upon which disk brake pads 108 contact disk brake rotor 104 as disk brake rotor 104 rotates. On the other hand, inner region 132 of disk brake rotor 104 is not contacted by disk brake pads 108 during rotation, and thus provides for optimal placement of magnetic encoding assemblies 110 and 126. FIG. 1 further illustrates an encoding source 116 coupleable to conducting segments 112, 114 of each assembly 110, 126 for magnetically encoding disk brake rotor 104.

Figure 2:
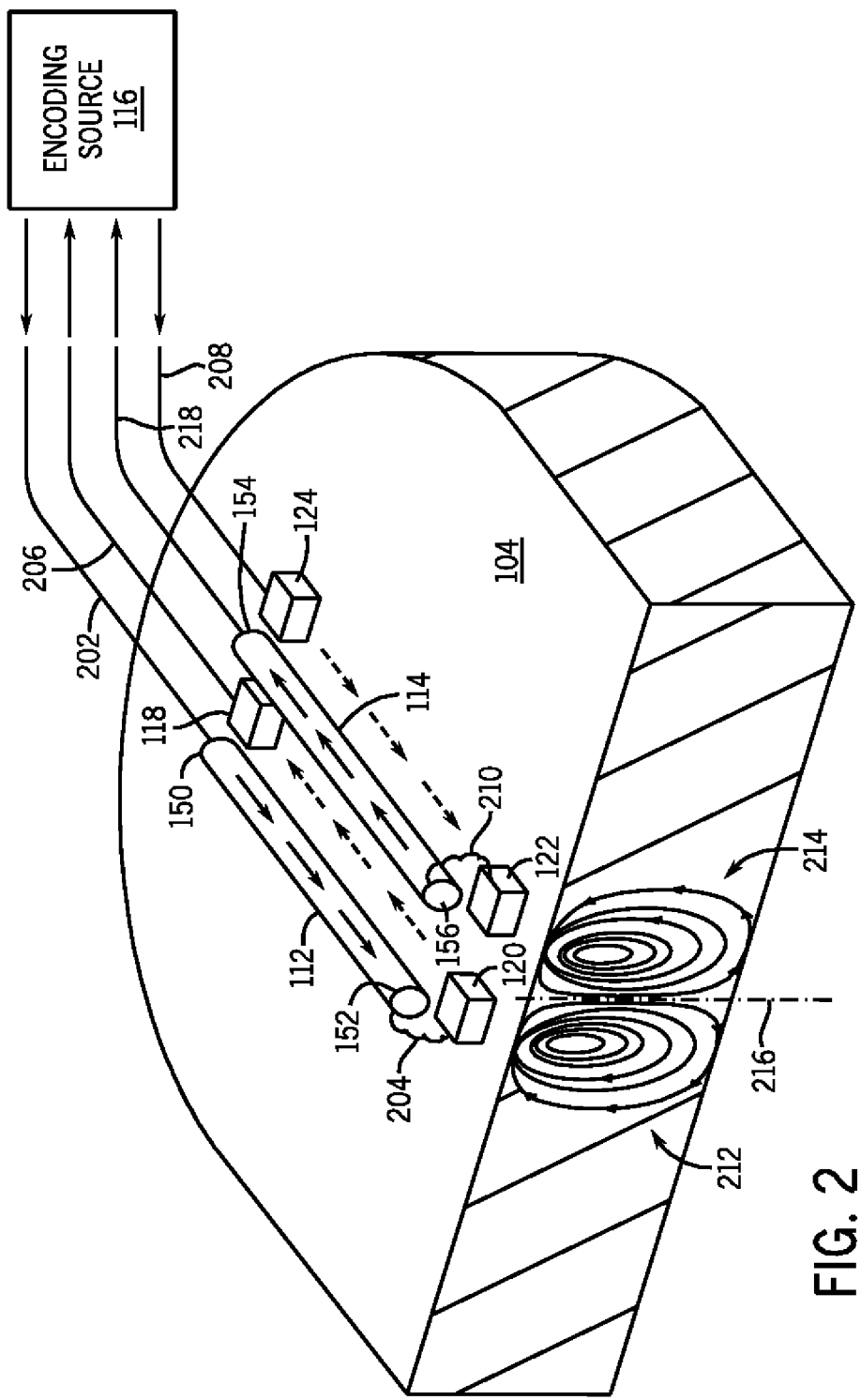
FIG. 2 is an isometric cross-sectional view of the disk brake assembly of FIG. 1.

Referring to FIG. 1 and to FIG. 2, which shows a three-dimensional cross-sectional view of magnetically encoded disk brake rotor 104 along line 2-2 of FIG. 1, a first end 150 of conducting segment 112 is coupled to encoding source 116 via a first encoding lead 202, while a second end 152 of conducting segment 112 is electrically coupled to a first electrode 120 disposed directly on disk brake rotor 104 near conducting segment 112 via an electrode lead 204. A second electrode 118 is disposed directly on disk brake rotor 104 in proximity to first end 150 of conducting segment 112 and is coupled to encoding source 116 via a second encoding lead 206. A first end 154 of conducting segment 114 is coupled to encoding source 116 via a third encoding lead 218, while a second end 156 of conducting segment 114 is electrically coupled to a third electrode 122 disposed directly on disk brake rotor 104 near conducting segment 114 via an electrode lead 210. A fourth electrode 124 is disposed directly on disk brake rotor 104 in proximity to first end 154 of conducting segment 114 and is coupled to encoding source 116 via a fourth encoding lead 208. While not illustrated, it is to be understood that each magnetic encoding assembly 110 in FIG. 1 comprises a plurality of conducting segments and electrodes electrically coupleable to encoding source 116.

Encoding source 116 provides electrical current that travels from first encoding lead 202 and back to second encoding lead 206 via conducting segment 112, electrode lead 204, electrode 120, disk brake rotor 104, and electrode 118. The current traveling through the disk brake rotor 104 segment between electrodes 120, 118 creates or forms a polarized magnetic region 212 in disk brake rotor 104.

Likewise, encoding source 116 provides electrical current that travels from fourth encoding lead 208 and back to third encoding lead 218 via electrode 124, disk brake rotor 104, electrode 122, electrode lead 210, and conducting segment 114. The current traveling through the disk brake rotor 104 segment between electrodes 124, 122 creates or forms another polarized magnetic region 214 in disk brake rotor 104. Polarized magnetic region 214, as can be seen in FIG. 2, has a polarity opposite that of magnetic region 212. The magnetic regions 212, 214 can be created using either a sequential encoding approach, wherein each magnetic region is individually encoded with a certain polarity from the encoding source, or using a simultaneous encoding approach, wherein each magnetic region is encoded simultaneously. The benefit of the simultaneous encoding approach is that the magnetization of encoded magnetic region will not influence the magnetization of the next magnetic region that is encoded at a later time.

Referring still to FIG. 2, conducting segments 112 and 114 are positioned at the surface of disk brake rotor 104, as was discussed above with respect to FIG. 1. Conducting segments 112 and 114 are electrically connected to electrodes 120 and 122, respectively, with electrodes 120 and 122 being mounted directly on a surface of disk brake rotor 104. Conducting segments 112 and 114 illustrate the alternating opposing polarities used during the encoding process by encoding source 116. For example, conducting segment 112 may act as a negative polarity segment while conducting segment 114 may act as a positive polarity segment. Again, the magnetic encoding generates sectional polarized magnetic regions 212 and 214. As illustrated in FIG. 2, the magnetic field lines of sectional polarized magnetic regions 212 and 214 are concentrated near a surface of disk brake rotor 104. Such a concentration of magnetic field lines near the surface is advantageous when sensing the magnetic field using conventional magnetic field sensors, as the highest magnetic flux densities are created close to the surface of disk brake rotor 104.

FIG. 2 further shows that polarized magnetic regions 212 and 214 define a magnetic domain boundary 216 therebetween, the magnetic domain boundary 216 being created by the opposing polarity of polarized magnetic regions 212 and 214. Magnetic domain boundary 216 tends to have a high magnetic flux density measurable near the surface of disk brake rotor 104 when disk brake rotor 104 is subject to mechanical stress caused by braking torque. Thus, when using magnetic field sensors to sense torque on disk brake rotor 104, magnetic domain boundary 216 affords an optimal sensing location.

While FIG. 2 illustrates the cross-sectional view of disk brake rotor 104 around one magnetic encoding assembly 110, it is to be understood that each region of disk brake rotor 104 encoded by respective magnetic encoding assemblies 110 has similar polarized magnetic regions associated therewith.

While the embodiment described above with respect to FIG. 1 illustrates that disk brake rotor 104 is magnetically encoded while disk brake rotor 104 is installed on the disk brake rotor hub/wheel mount assembly 102, the invention is not limited as such. Disk brake rotor 104 could instead be magnetically encoded during the manufacturing process or post-manufacture, prior to installation on the disk brake rotor hub/wheel mount assembly 102. Performing magnetic encoding prior to installation may greatly ease the encoding process. Furthermore, FIG. 1 also shows that the magnetic encoding performed is sectional magnetic encoding, wherein a plurality of regions of disk brake rotor 104 are individually magnetically encoded. However, the invention is not limited to sectional magnetic encoding, and instead could employ non-sectional magnetic encoding, wherein the entire disk brake rotor 104 is magnetically encoded.

Figure 3:
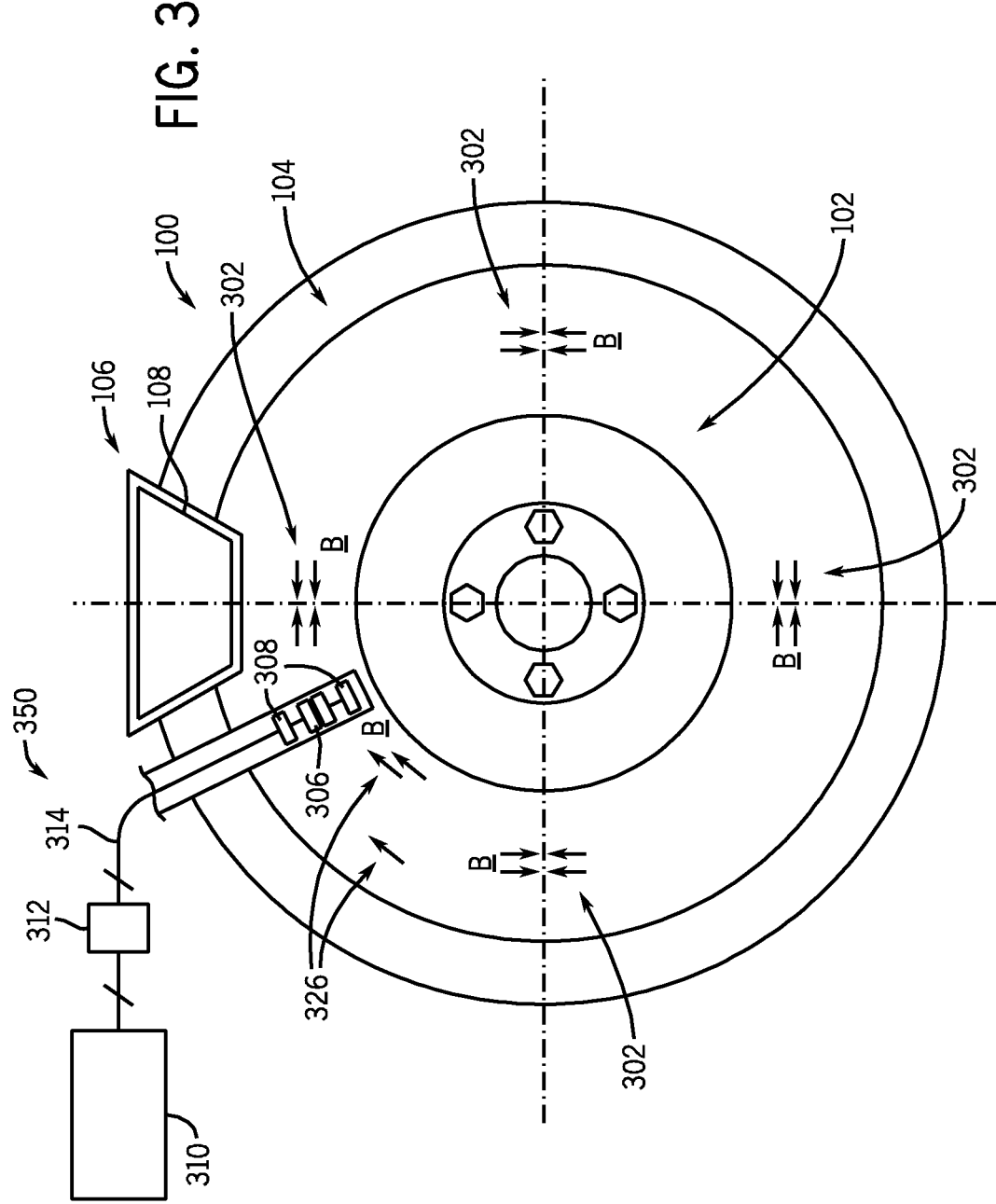
FIG. 3 schematically illustrates the disk brake assembly of FIG. 1 and a control system coupled thereto according to an embodiment of the invention.

Referring now to FIG. 3, a magnetically encoded disk brake assembly 100 having a control system 350 coupled thereto is shown according to an embodiment of the invention. A plurality of magnetically encoded regions 302, 326 are encoded and located throughout disk brake rotor 104 during encoding according to an embodiment of the invention as described above. As disk brake assembly 100 rotates, a sensor assembly 304 of control system 350 senses the magnetic fields of magnetically encoded regions 302 and 326. The sensor assembly 304 is mounted in proximity to disk brake rotor 104 and comprises one or more torque magnetic field sensors 306 and one or more speed/direction magnetic field sensors 308. Magnetic field sensors 306, 308 are typically low-cost and easily replaceable. Examples of such sensors include Hall Effect sensors, giant magnetoresistive (GMR) sensors, fluxgate sensor, and magnetoimpedence sensors. As disk brake rotor 104 rotates, torque magnetic field sensors 306 detect the magnetic field at the magnetic domain boundary of each encoded region 302. Signals from torque magnetic field sensors 306 are then sent via bus 314 to a signal processor 312, where the data is processed to determine the torque imparted on disk brake rotor 104 based on the torque-dependent magnetic fields of magnetically encoded regions 302.

Still referring to FIG. 3, signals from speed/direction magnetic field sensors 308 are also sent via bus 314 to signal processor 312, where the speed and direction of rotation of disk brake rotor 104 is determined. Unlike magnetically encoded regions 302, which are used to determine a torque applied to disk brake rotor 104, magnetically encoded regions 326 are not encoded using conducting segments having opposing polarities, as the determination of rotor speed and direction based on signals from speed/direction magnetic field sensors 308 does not rely upon the detection of a change of magnetic flux at the encoded region such as in the case when determining brake rotor torque via torque magnetic field sensors 306. The data from signal processor 312 is then sent to a vehicle system/ABS brake controller 310 located within the vehicle (not shown). Thus, based on the detected brake rotor torque, wheel speed, wheel direction, or a combination thereof, vehicle system/ABS brake controller 310 can determine if any individual wheels of the vehicle are losing traction or if the brakes are locked. In this way, the vehicle's ABS and/or TC system is able to respond with corrective action, i.e., a temporary application of the disk brake caliper to reduce wheel spin or a momentary release of the disk brake caliper during wheel lockup.

Figure 4:
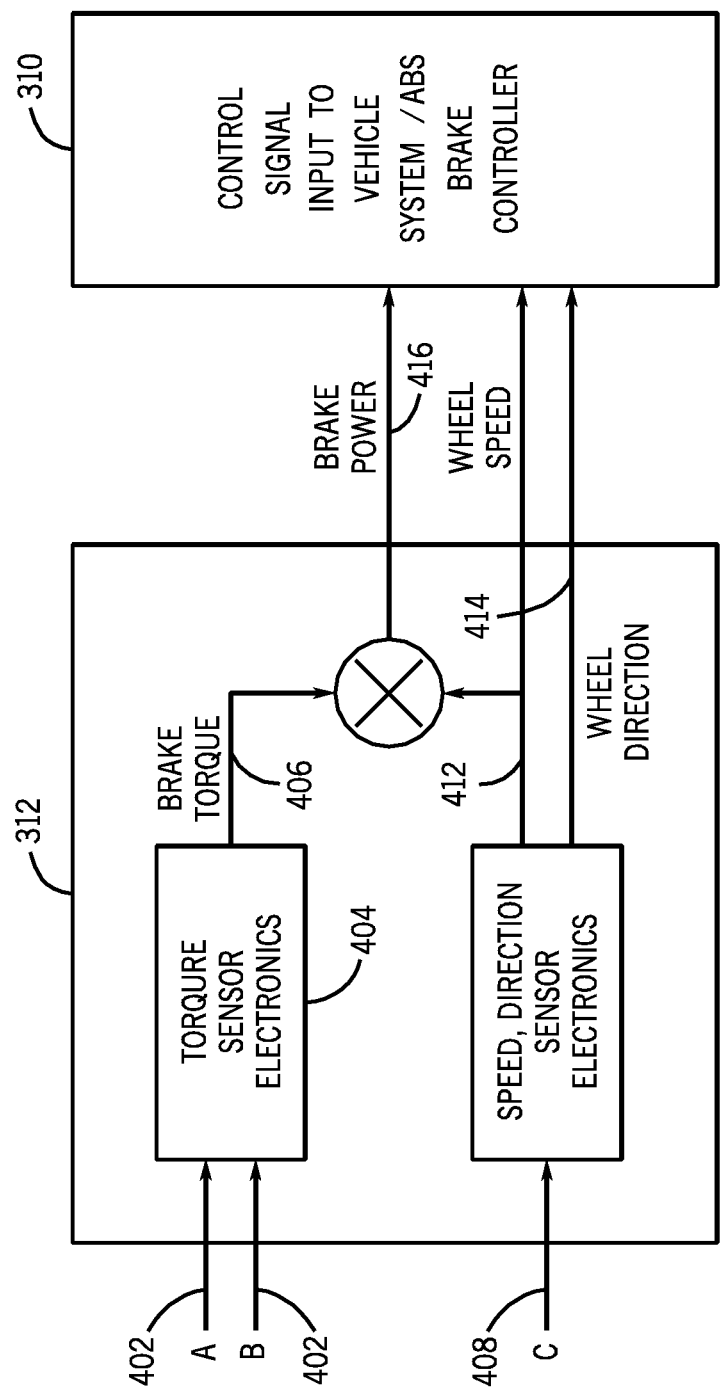
FIG. 4 is a block diagram of the operation of the control system of FIG. 3 according to an embodiment of the invention.

FIG. 4 is a block diagram illustrating the operation of sensor assembly 304, signal processor 312, and vehicle system/ABS brake controller 310 in accordance with an embodiment of the invention. As FIG. 4 shows, signal inputs 402 from the torque sensors 306 are received by torque sensor electronics 404 located within signal processor 312, which determines the brake rotor torque 406. Speed sensor input 408 from speed/direction sensors 308 is received by speed/direction sensor electronics 410 within signal processor 312, whereby both the wheel/brake rotor speed 412 and the wheel direction 414 are each determined. By combining the information pertaining to the determined brake rotor torque 406 and wheel/brake rotor speed 412, brake power 416 is determined by signal processor 312. Brake power 416, wheel/brake speed 412, and wheel direction 414 signals are then input at a high bandwidth to vehicle system/ABS brake controller 310. From these input signals, vehicle system/ABS brake controller 310 is capable of actively detecting adverse wheel lockup or spinning and quickly respond with an appropriate corrective action. As the signals related to brake power, wheel/brake rotor speed, and wheel direction are input to the controller at high bandwidths, the corrective action taken by the controller can be similarly expedited, thereby improving the overall dynamic performance of the ABS and/or TC system.

Additionally, the information collected regarding brake torque can also be used in conjunction with other functions of the brake to warn an operator of impending brake failure. For example, a vehicle system controller (not shown) can detect hydraulic brake pressure and compare that pressure to the brake torque determined via torque sensor electronics using the method described above. If the brake torque is not proportional to the brake pressure applied, there is an increased possibility of brake failure. Additionally, measurement of brake torque and calculation of brake power at each individual brake assembly allows the vehicle system controller (not shown) to project the temperature rise of brake components, thereby providing information to warn the driver of incipient brake performance degradation or failure. Thus, a warning, such as an audible or visual indicator, can be sent to the operator immediately. Any maintenance or replacement of disk brake components can then be performed prior to catastrophic failure, thereby increasing the safety and cost-effectiveness of the braking system.

Figure 5:
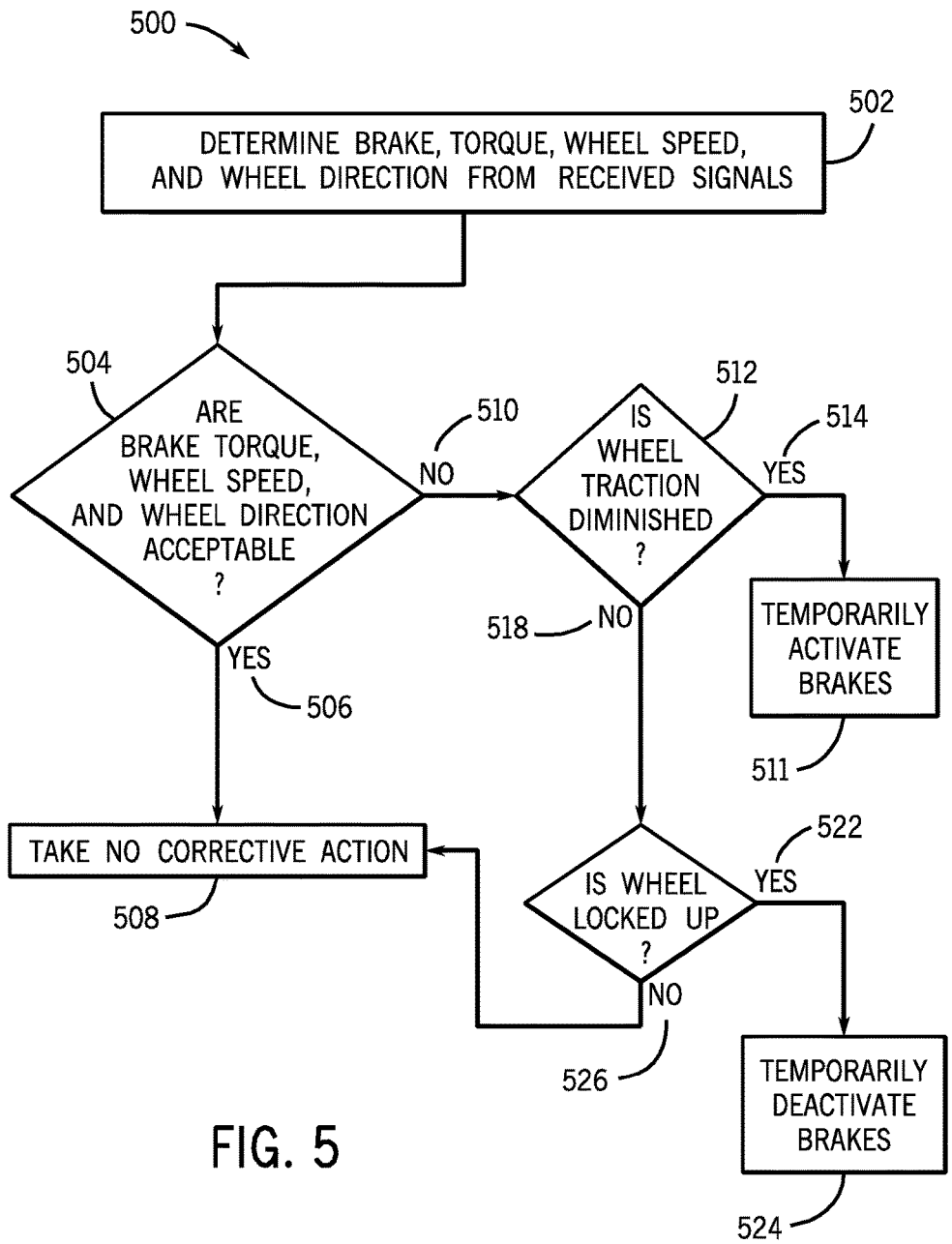
FIG. 5 is a flowchart describing the operation of the vehicle control/ABS braking system according to an embodiment of the invention.

Referring to FIG. 5, a flowchart 500 describing the operation of the vehicle system/ABS brake controller according to an embodiment of the invention is shown. At step 502, the brake rotor torque, wheel speed, and wheel direction are determined based on the signals received from the torque and speed/direction magnetic field sensors. At step 504, it is determined if all of the brake rotor torque, the wheel speed, and the wheel direction are within predetermined thresholds or limits. If the thresholds are not exceeded 506, then no corrective action with respect to the brake caliper is taken at step 508. However, if any of the predetermined thresholds is exceeded 510, then it is determined if the wheel traction is diminished (i.e., the wheel is rotating faster than a predetermined rate) at step 512. If yes 514, the brake or brakes are temporarily activated to correct for the diminished wheel traction at step 516. If no 518, it is determined if the wheel is locked up (i.e. the wheel is not rotating or rotating slower than a predetermined rate) at step 520. If yes 522, then the brake or brakes are temporarily deactivated to correct for the wheel lock up at step 524. If no 526, it is determined that no corrective action is needed. Using the steps of flowchart 500, the ABS and/or TC system according to an embodiment of the invention is able to use data from magnetic field sensors incorporated with a disk brake assembly to provide optimal anti-skid braking and traction control.

Figure 6:
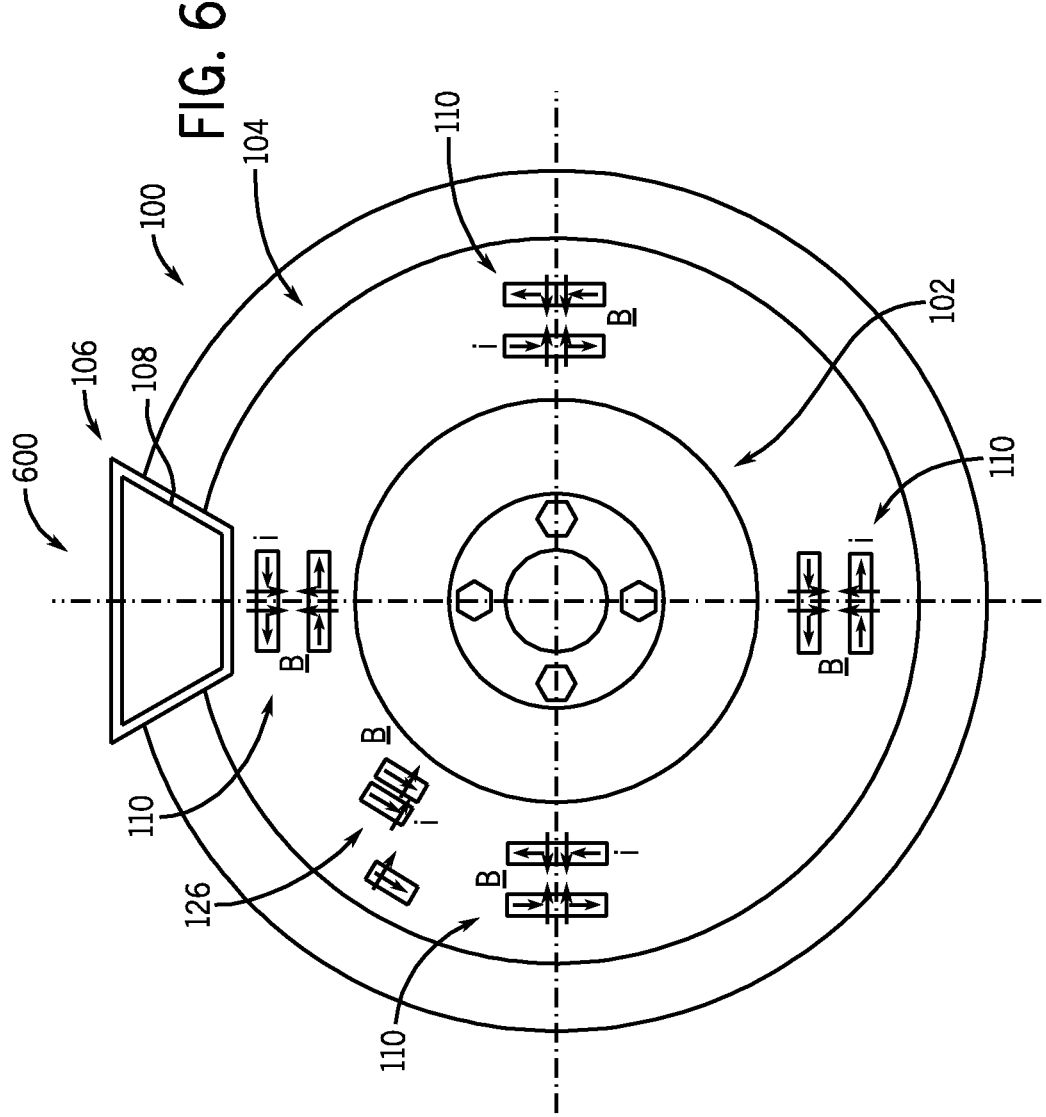
FIG. 6 schematically illustrates the disk brake assembly of FIG. 1 according to another embodiment of the invention.
Figure 7:
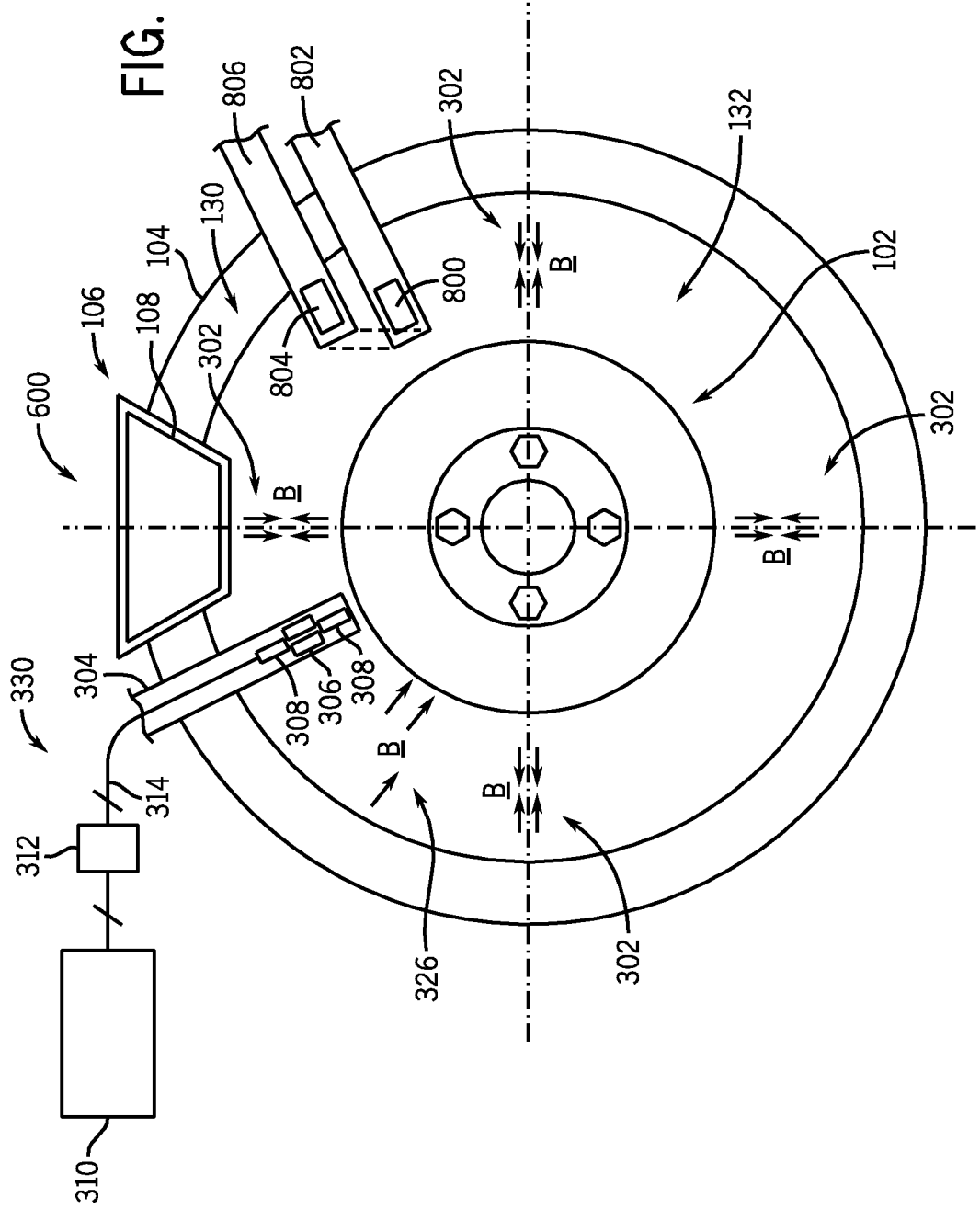
FIG. 7 schematically illustrates the disk brake assembly and a control system according to the embodiment shown in FIG. 6.

Referring now to FIGS. 6 and 7, disk brake assembly 100 is shown according to another embodiment of the invention. Disk brake assembly 100 has the plurality of magnetic encoding assemblies 110 and 126 disposed proximately to magnetic encoding assemblies 110 and 126, but in contrast to that shown in FIG. 1, magnetic encoding assemblies 110 and 126 in FIG. 6 are oriented differently from that which is shown in FIG. 1. That is, magnetic encoding assemblies 110 and 126 are positioned perpendicularly to the orientation of the magnetic encoding assemblies 110 and 126 shown in FIG. 1. Thus, while the process for magnetically encoding disk brake rotor 104 of FIG. 6 is similar to the process discussed above with respect to FIG. 1, the orientation of the sectional polarized magnetic regions will differ.

FIG. 7 illustrates the magnetically encoded disk brake assembly 100 having the orientation of sectional polarized magnetic regions 302 perpendicularly oriented when compared to those shown in FIG. 3. Thus, the magnetic domain boundary between each polarized magnetic region 302 also differs in orientation. As the greatest change in magnetic flux density when torque is applied to the disk brake rotor occurs at or close to the magnetic domain boundaries, it is beneficial to detect the torque at that location. Therefore, torque magnetic field sensors 306 are positioned on sensor assembly 304 such that the torque on disk brake rotor 104 is optimally sensed as disk brake rotor 104 rotates, wherein the orientation of torque magnetic field sensors 306 is dependent upon the orientation of the magnetic domain boundary of sectional polarized magnetic regions 302. Similarly, speed/direction magnetic field sensors 308 are also positioned on sensor assembly 304 based on the orientation of each polarized magnetic region 326.

FIG. 7 also illustrates additional magnetic field sensor 800, mounted on sensor assembly 802, and additional magnetic field sensor 804, mounted on sensor assembly 806. As will be described below with respect to FIG. 8, magnetic field sensors 800, 804 are configured to determine a temperature of disk brake rotor 104.

Figure 8:
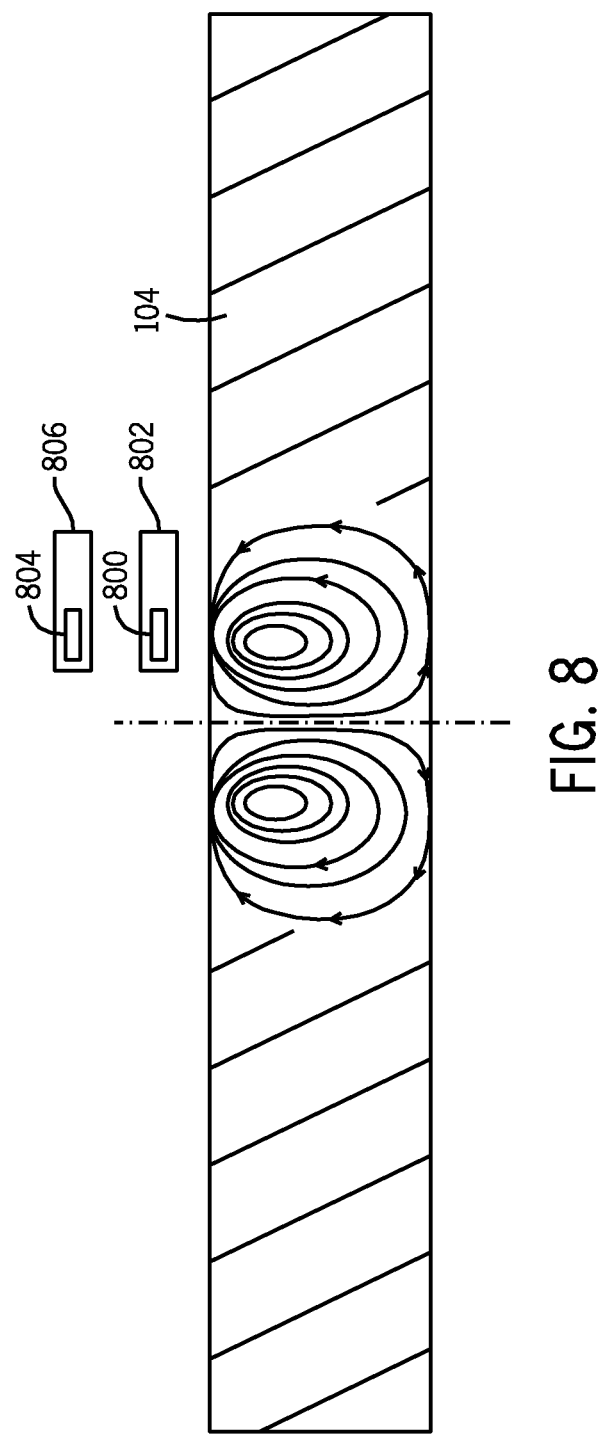
FIG. 8 is a cross-sectional view of the disk brake assembly according to another embodiment of the invention.

Referring now to FIG. 8, a disk brake assembly according to the invention is illustrated employing additional sensors used for detecting the temperature of the disk brake rotor, as discussed above with respect to FIG. 7. That is, temperature changes in disk brake rotor 104 will lead to a change of the signal intensity detected by a magnetic field sensing device. Using at least two magnetic field sensors 800 and 804 positioned at different axial distances from magnetically encoded disk brake rotor 104, the differences between the detected signals can be used to determine the amount of signal intensity change due to temperature effects, which can in turn be used to calculate the temperature of disk brake rotor 104. Ideally, a first temperature magnetic field sensor 800 is installed close to disk brake rotor 104 on a sensor assembly 802 (or, alternatively, on sensor assembly 304 shown in FIG. 3), while a second temperature magnetic field sensor 804 is installed sufficiently distant from disk brake rotor 104 so as not to be affected by the signal intensity change due to a disk brake temperature increase. The differences between the signals detected by first and second magnetic field sensors 800 and 804 can then be compared to enable the temperature of disk brake rotor 104 to be calculated by a vehicle system controller. That is, the signal intensity detected by first magnetic field sensor 800 will vary depending upon the temperature of disk brake rotor 104, while the signal intensity detected by second magnetic field sensor 804 should not. This difference in signal intensity can be used to calculate the approximate temperature of disk brake rotor 104 while in operation. In this way, the temperature of disk brake rotor 104 can be easily monitored to warn an operator of a malfunction or potential failure of the disk brake assembly, or to enable the vehicle system controller to perform a corrective action so as to decrease the temperature of the disk brake rotor.

Additionally, a difference of the signal intensity can also occur if a torque is applied at disk brake rotor 104, generating a torque-dependent magnetic field component. Therefore, the magnetic field sensors 800, 804 for measuring temperature must be based on measuring a magnetic field component in a direction that is perpendicular to the torque-dependent magnetic field. Thus, only temperature changes to disk brake rotor 104, and not the torque applied, affects the measured magnetic field signal close to disk brake rotor 104, whereas the signal measured at some distance from disk brake rotor 104 would stay unchanged. Measuring the difference between these two magnetic field measurements based on using the same processing electronics results in a signal that only depends on the temperature of disk brake rotor 104.

According to one embodiment of the invention, a disk brake system includes a magnetically encoded disk brake rotor having at least one magnetized section encoded therein and a disk brake caliper comprising a plurality of disk brake pads attached thereto, the disk brake pads positioned adjacently to the disk brake rotor and configured to frictionally engage the disk brake rotor upon operation of the disk brake caliper. The disk brake system further comprises a sensor assembly mounted proximately to the disk brake rotor and comprising at least one magnetic field sensor configured to detect the at least one magnetic field, and a controller configured to receive signals from the at least one magnetic field sensor, wherein the controller is further configured to enable selective operation of the disk brake caliper based on the signals received from the at least one magnetic field sensor.

In accordance with another embodiment of the invention, a method of controlling a braking system in a vehicle includes detecting at least one magnetic field from a magnetically encoded brake rotor using a plurality of magnetic field sensors, and determining a brake rotor torque, a wheel speed, and a wheel direction based on the at least one detected magnetic field. The method further comprises controlling an engagement of a brake caliper with the brake rotor based on the brake rotor torque, wheel speed, and wheel direction.

Another embodiment of the invention includes a method of manufacturing a disk brake assembly for a vehicle, wherein the method comprises magnetically encoding a disk brake rotor using at least one conductor electrically connected to at least one electrode, wherein the at least one electrode is attached to a surface of the disk brake rotor, and mounting a plurality of magnetic field sensors in proximity to the disk brake rotor such that the magnetic field sensors detect at least one magnetic field emanating from the magnetically encoded disk brake rotor. The method further comprises inserting the disk brake rotor into a disk brake caliper such that the disk brake caliper can be selectively engaged with the disk brake rotor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A disk brake system comprising:
a magnetically encoded disk brake rotor having at least one magnetized section encoded therein, wherein the at least one magnetized section comprises a pair of oppositely polarized regions positioned adjacently to each other and forming a magnetic domain boundary therebetween;
a disk brake caliper comprising a plurality of disk brake pads attached thereto, the disk brake pads positioned adjacently to the disk brake rotor and configured to frictionally engage the disk brake rotor upon operation of the disk brake caliper;
a sensor assembly mounted proximately to the disk brake rotor and comprising at least one magnetic field sensor configured to detect the magnetic domain boundary;
a controller configured to receive signals from the at least one magnetic field sensor, wherein the controller is further configured to:
determine a brake rotor torque based on a change of the magnetic domain boundary; and
enable selective operation of the disk brake caliper based on the brake rotor torque.

2. The disk brake system of claim 1 wherein the controller is configured to determine the brake rotor torque based on a change of magnetic flux at the magnetic domain boundary.

3. The disk brake system of claim 1 wherein the sensor assembly comprises at least one magnetic field sensor configured to detect a wheel speed and a wheel direction.

4. The disk brake system of claim 1 wherein the disk brake rotor is sectionally magnetically encoded.

5. The disk brake system of claim 4 wherein the disk brake rotor is sectionally magnetically encoded in at least four encoding regions.

6. The disk brake system of claim 1 wherein a magnetic domain boundary is formed between the pair of oppositely polarized regions.

7. The disk brake system of claim 1 wherein the controller is configured to:
determine if the disk brake rotor is rotating at a rate higher than a predetermined threshold; and
if so, temporarily engage the disk brake caliper with the disk brake rotor.

8. The disk brake system of claim 1 wherein the controller is configured to:
determine if the disk brake rotor rotating at a rate lower than a predetermined threshold; and
if so, temporarily disengage the disk brake caliper from the disk brake rotor.

9. The disk brake system of claim 1 wherein the controller is configured to determine brake power based on received signals from the at least one magnetic field sensor.

10. The disk brake system of claim 9 wherein the controller is configured to project a temperature rise of the disk brake rotor based on the determined brake power, and wherein the controller is further configured to provide a warning regarding possible brake performance degradation or failure based on the projected temperature rise.

11. The disk brake system of claim 1 wherein the at least one magnetic field sensor is one of a Hall Effect sensor, a giant magneto-resistive (GMR) sensor, a fluxgate sensor, and a magnetoimpedence sensor.

12. The disk brake system of claim 1 further comprising:
a first magnetic field sensor located a first distance away from the disk brake rotor such that detection of a signal intensity at the magnetic domain boundary by the first magnetic field sensor is dependent upon a temperature of the disk brake rotor;
a second magnetic field sensor located a second distance away from the disk brake rotor such that detection of a signal intensity at the magnetic domain boundary by the second magnetic field sensor is independent of a temperature of the disk brake rotor; and
wherein the controller is further configured to:
receive a signal from the first magnetic field sensor;
receive a signal from the second magnetic field sensor; and
determine a temperature of the disk brake rotor by calculating a signal intensity difference between the signals from the first and second magnetic field sensors.

13. A method of controlling a braking system in a vehicle, the method comprising:
detecting a plurality of first magnetic field regions magnetically encoded in a brake rotor using at least one magnetic field sensor;
detecting second magnetic field region magnetically encoded in the brake rotor using at least another magnetic field sensor, wherein the second magnetic field region comprises a pair of oppositely polarized regions encoded in the brake rotor adjacently to each other such that a magnetic domain boundary is formed therebetween;

determining a wheel speed and a wheel direction based on the plurality of detected first magnetic field regions;

determining a brake rotor torque based on a change of the magnetic domain boundary; and controlling an engagement of a brake caliper with the brake rotor based on the brake rotor torque, wheel speed, and wheel direction.

14. The method of claim 13 further comprising detecting a wheel lockup based on the brake rotor torque, wheel speed, and wheel direction; and wherein controlling the engagement comprises momentarily releasing engagement of the brake caliper with the brake rotor based on the detected wheel lockup.

15. The method of claim 13 further comprising detecting a wheel slippage based on the brake rotor torque, wheel speed, and wheel direction; and wherein controlling the engagement comprises momentarily engaging the brake caliper with the brake rotor based on the detected wheel slippage.

16. The method of claim 13 wherein determining the brake rotor torque comprises determining the brake rotor torque based on a magnetic flux change at the magnetic domain boundary.

17. The method of claim 13 further comprising determining a temperature of the brake rotor based on the at least one detected magnetic field.

18. A method of manufacturing a disk brake assembly for a vehicle, the method comprising:

magnetically encoding a disk brake rotor using at least one conductor electrically connected to at least one electrode, wherein the at least one electrode is attached to a surface of the disk brake rotor;

mounting a plurality of magnetic field sensors in proximity to the disk brake rotor such that the magnetic field sensors detect at least one magnetic field emanating from the magnetically encoded disk brake rotor; and inserting the disk brake rotor into a disk brake caliper such that the disk brake caliper can be selectively engaged with the disk brake rotor.

19. The method of manufacturing of claim 18 wherein magnetically encoding the disk brake rotor comprises sectionally magnetically encoding the disk brake rotor using a plurality of conductors attached in proximity to various regions of the surface of the disk brake rotor.

20. The method of manufacturing of claim 18 wherein mounting the plurality of magnetic field sensors comprises mounting the plurality of magnetic field sensors to a single sensor assembly located in close proximity to the disk brake caliper.

21. The method of manufacturing of claim 18 further comprising:

mounting the at least one conductor adjacently to the surface in a first orientation; and wherein mounting the plurality of magnetic field sensors comprises a second orientation perpendicular to the first orientation.

* * * * *